United States Patent [19]

Campanini

[11] Patent Number: 4,593,954
[45] Date of Patent: Jun. 10, 1986

[54] AIR BRAKE VALVE SYSTEM
[75] Inventor: Sergio Campanini, Iola, Kans.
[73] Assignee: Hose America, Inc., Iola, Kans.
[21] Appl. No.: 661,761
[22] Filed: Oct. 17, 1984
[51] Int. Cl.$^4$ ............................................. B60T 13/22
[52] U.S. Cl. ..................................... 303/7; 303/6 M; 303/9; 303/71
[58] Field of Search ..................... 303/6 M, 7, 9, 8, 13, 303/6 C, 28–30, 40, 64, 47, 71, 68, 69, 46, 84 R; 188/170, 349; 137/102

[56] References Cited
U.S. PATENT DOCUMENTS

| | | | |
|---|---|---|---|
| 3,862,782 | 1/1975 | Horowitz et al. | 303/40 |
| 4,058,349 | 11/1977 | Ury | 303/69 |
| 4,080,004 | 5/1978 | Ury | 303/9 |
| 4,119,351 | 10/1978 | Durling | 303/6 M |
| 4,191,428 | 3/1980 | Durling | 303/6 M |
| 4,354,713 | 10/1982 | Edwards | 303/8 |
| 4,397,505 | 8/1983 | Linkner | 303/6 M X |
| 4,472,001 | 9/1984 | Fannin | 303/6 M X |

Primary Examiner—Douglas C. Butler
Attorney, Agent, or Firm—Dowell & Dowell

[57] ABSTRACT

An air brake control system for use in truck trailers having at each axle compressed-air brakes including spring brakes and service brakes, and each trailer being coupled to receive compressed air through an emergency (supply) gladhand and to receive service brake signals through a service (control) gladhand, the invention comprising an integrated brake valve system for each axle of each trailer, including a common valve housing; a spring brake valve cluster having a non-return check valve connected to receive and pass air pressure from the emergency gladhand and to deliver it directly to the spring brakes and an air pressure responsive shuttle operative to open the check valve whenever the emergency line pressure falls below a predetermined spring brake isolation pressure above which the spring brake holding pressure is not affected by fluctuations of the emergency gladhand pressure; and including an air tank supply valve cluster connected between the emergency gladhand and the tank and operative to sense pressure in the emergency gladhand and to open at a tank-filling threshold pressure above the predetermined spring brake isolation pressure to pass air to the tank and having a tank protecting check valve to prevent backflow of air from the tank; and including a pressure amplifying service brake relay valve cluster connected between the tank and the service brakes to supply and modulate air to the latter responsive to variations in the service gladhand pressure.

20 Claims, 9 Drawing Figures

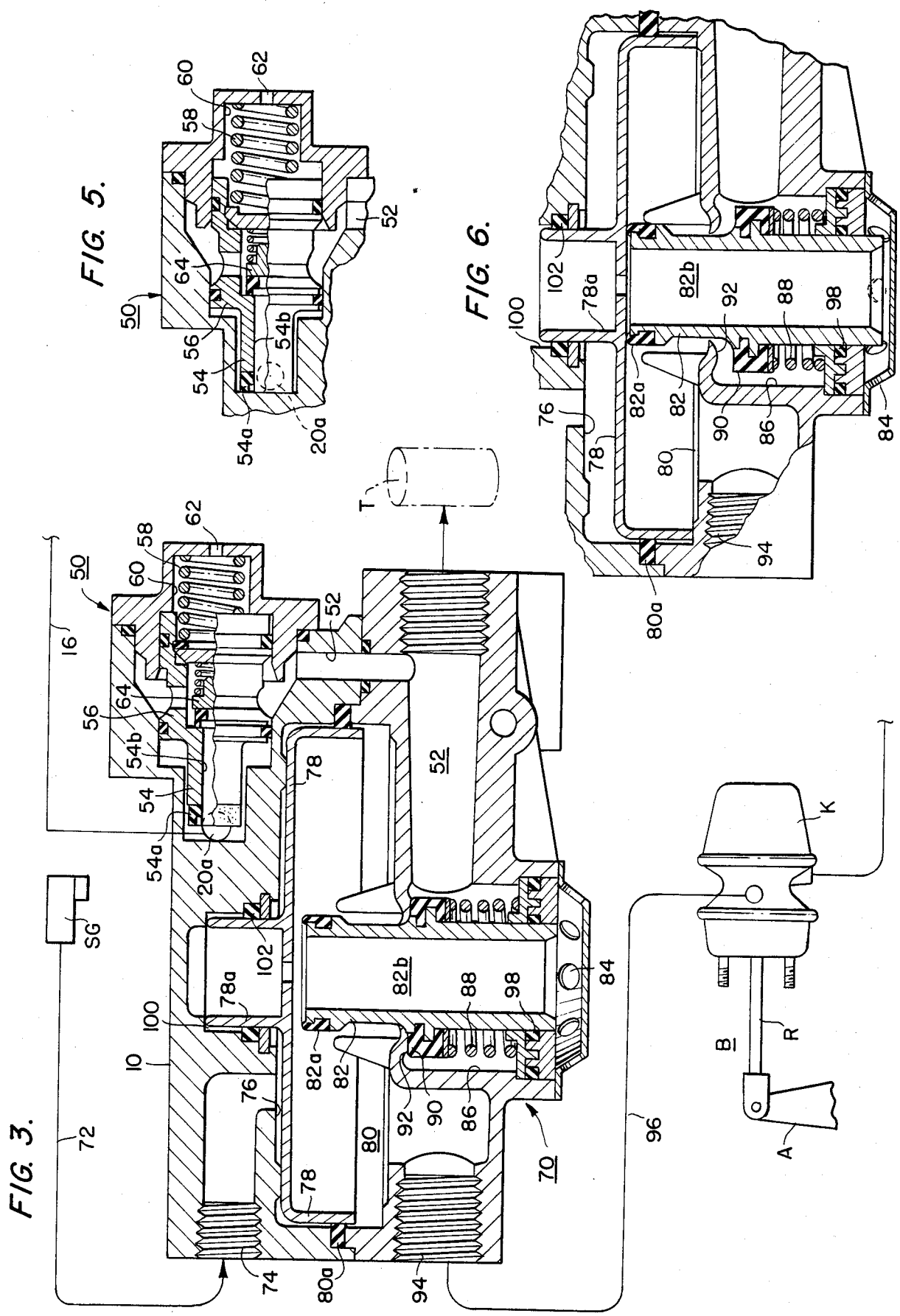

AIR BRAKE VALVE SYSTEM

This invention relates to improvements in air brake control systems to control the braking functions of multi-axle heavy duty vehicles, and more particularly relates to an improved modular system for use in connection with each axle of a trailer or trailers while being towed behind tractor vehicles.

BACKGROUND AND PRIOR ART

The development of air-brake systems for use on heavy duty tractor-trailer road vehicles has been partly under the control of the industry and partly under the control of regulations promulgated by government agencies, presently comprising the Department of Transportation (DOT).

In the 1960's spring brakes were developed which were connected in piggyback fashion onto the service brake chambers, and air pressure was used to hold the spring brakes OFF. The trailer spring brakes were typically connected directly to the air tank and merely served as stand-by mechanical brakes ready to replace the holding force normally supplied by the air brakes in the event that air pressure in the latter decayed due to air leaks. These stand-by mechanical brakes solved the problem of run-away due to loss of air pressure, for instance in a trailer parked for a long time on a ramp.

Up until 1975, a relay emergency valve (REV) received both the service control line pressure and the emergency line pressure, the emergency line being also the air supply pressure line, and the REV supplied air under pressure from the trailer reservoir tank to the brake actuators. The trailer tank was protected by a check valve against loss of pressure back through the emergency line. The REV further served as a relay valve which used the trailer tank as the source of pressure to apply the service brakes of the trailer under the control of the driver. The emergency function of the REV operated such that if the emergency line pressure fell below a preset value of approximately 45 psi, the remaining air in the trailer tank was connected directly to the actuators in the trailer service brake chambers, whereby automatically to stop and park the vehicle regardless of the condition of the brake signal in the service control line.

In 1975, the DOT issued a full revision of requirements, designated as N.H.T.S.A.-121. This regulation separated the various brake functions from eachother, requiring a separate Emergency system and Parking brake system, and Service brake and Antilock brake system. As a result, at least two separate reservoirs were installed on each trailer, one or more for the service brakes and one for the spring brakes. The latter had to be protected against loss of air in the event of failure elsewhere in the system. Furthermore, the system had to have enough air remaining in the protected tank after a failure that the spring brakes could be released at least twice, so that a trailer could be moved from the scene of an accident without having to mechanically disconnect the spring brakes, which is time consuming and would delay clearing of a highway. Although originally a tandem axle trailer used one protected tank, and a separate unprotected tank for each of the tandem axles, some systems are equipped with only one tank for each axle where the tanks are connected together by a valve system that separates them in the event that pressure in one of the tanks falls below a predetermined level. Separate valves were required to control the service brakes and to contol the spring brakes, and an override electronic control of the service brakes was required to prevent prolonged wheel lock-up. (rescinded in 1978)

Over the period from 1975 to 1981, several generations of valves and manufacturer's systems have come and gone. So many valves and tanks have been added to existing trailers that there is great confusion among maintenance personnel and trailer fleet operators. In 1981 the DOT issued a notice of proposed rule making generally dropping the requirement for a separate protected tank in the trailer systems, but to date no final action has been taken by the DOT. A fear has been expressed that without the protected tank, unusually high fluctuations in the supply air pressure caused by hard braking might cause the spring brakes to partially apply, causing dragging and the attendant possibility of fire.

The present invention seeks to provide a single valve housing which provides an improved operation of the system, meets necessary safety requirements, and simplifies the system, especially as to the number of valves and air lines appearing beneath the trailer chassis. The individual valve clusters contained within the present single housing resemble in many ways prior art patented individual valves, but include improvements not found therein.

In the patented prior art, U.S. Pat. Nos. 4,119,351 and 4,191,428 to Durling show valves for filling the air chambers of trailer spring brakes to a predetermined pressure level and maintaining that level despite service brake system variations, but exhausting all air from the spring brakes in response to an unusual fall in service brake pressure. U.S. Pat. No. 4,058,349 to Ury shows another such spring brake valving system which abruptly releases the spring brakes in the event of loss of service brake pressure to a given level.

U.S. Pat. No. 4,080,004 to Ury shows a spring brake valve system using air in a protected tank to release the spring brakes through check valves, wherein the brake chambers can be vented to apply the spring brakes without venting the air reservoir.

U.S. Pat. No. 3,862,782 to Horowitz et al shows a single housing containing plural valve clusters and designed to operate using a protected reservoir which is separate from the service brake reservoir. The valve controls the supply of pressure to the service reservoir and the emergency reservoir, applies spring brake releasing pressure, includes a protection valve for the vehicle service brake tank, and includes a check valve protecting the vehicle emergency tank.

U.S. Pat. No. 4,354,713 to Edwards shows a pressure amplifying valve that can be placed between the tractor brakes and the brakes of a trailer to amplify the braking pressure signal to the brakes of the towed vehicle.

THE INVENTION

Although many of the prior art valve systems incoporate multiple valves within a common housing, they still require a number of such housings for each trailer axle. The proliferation of tubing for interconnecting such separate valves and the complexity of interconnections is excessive. This invention places all of the valves required at each axle within a single housing to produce a much neater installation beneath the trailer chassis, so that fewer lines and housings are exposed to possible damage or breakage as a result of the hazards of the road. This invention further provides within the single valve housing for each axle a novel combination of valves which mutually cooperate to provide the necessary emergency brake and service brake and air tank filling and protection functions. The system for each axle includes an air reservoir tank, and three valve clusters integrated within the same valve housing.

A first emergency/parking brake cluster comprises a shuttle and two valves which control the spring brakes. A second cluster comprises a shuttle and two valves which control the filling and protection of the air reservoir tank. A third cluster comprises a piston and a follower valve which control the service brakes using air from the tank.

Starting with a fully discharged system, as the pressure in the emergency gladhand line builds, while the pressure is still below a preselected threshold pressure of 55 psi a low-pressure warning signal is given the driver in the tractor cabin, and the valves in the trailer cooperate to route all the air to charge the spring brake chambers, and none of the air goes to fill the air reservoir tank. One of the valves within the first valve cluster normally isolates the spring brake system from the remainder of the trailer brake systems and maintains the emergency chamber pressure at the highest level it achieves during normal functioning of the brake system so that fluctuations of pressures in the remainder of the brake systems affecting pressure in the emergency gladhand line can not draw down the pressure in the spring brake chambers. However, a shuttle in the first cluster continuously measures the pressure in the emergency line. If it should fall below a spring brake isolation pressure selected at 45 psi, the second valve opens to exhaust air from the spring chambers and allow the remaining pressure, if any, in the emergency gladhand line to modulate the spring brakes, or to fully apply them if the gladhand pressure goes very low or fails altogether. Thus the spring brakes are never drawn down by the remainder of the system except when the the gladhand pressure goes below the spring brake isolation pressure of 45 psi.

The second valve cluster which serves to fill the air reservoir tank uses its shuttle to keep an air inlet valve closed until the air pressure in the emergency gladhand line exceeds the threshold pressure of 55 psi, whereby all air initially introduced into the trailer emergency gladhand line first goes to the spring brakes to release them. When the line pressure goes above the threshold pressure of 55 psi said inlet valve is opened by the shuttle and air is routed also to fill the air tank, generally to 125 psi. The second valve in the second cluster serves as a check valve so that the tank pressure can never be drawn down by flowing back through the second cluster and gladhand, whereby the air reservoir tank is always protected even if the emergency gladhand line is vented or broken.

The third valve cluster which serves to control the service brakes comprises a piston which responds to variations in pressure within the service line gladhand as a result of driver's braking, and this piston controls a follower slide valve which delivers air to the service brake chambers from the air reservoir tank. The piston is so constructed that it not only accurately follows the pedal pressure fluctuations, but actually amplifies slightly the service line pressure for the purpose of increasing the braking pressure rearwardly of the trailer combination so that the rearward brakes are applied slightly more heavily than the forward brakes to increase vehicle stability. The slide valve which follows the piston is specially proportioned to minimize its initial cracking pressure as the valve is opened by application of the brake pedal.

The air pressures mentioned in this disclosure are given by way of examples and are believed to be representative of commonly used pressure levels, some of which levels have achieved a recognised status in highway braking systems. These pressures can of course be varied to accommodate different practical and government requirements. The spring brake isolation pressure, selected for illustration as 45 psi, is a pressure below which the spring brake pressures are modulated by the pressure in the emergency gladhand, but above which the spring brake pressures remain at the highest level achieved in the emergency gladhand. The threshold pressure, selected for illustration as 55 psi, is a pressure level below which all pressure in the emergency gladhand is routed exclusively to the spring brake valve cluster, and above which air is also routed to fill the service brake air tank.

OBJECTS AND ADVANTAGES OF THE INVENTION

It is a major object of the invention to provide an improved braking valve system which requires only one air reservoir tank and one valve housing per trailer axle, whereby the braking system can be simplified and integrated into a single valve module for each axle, which module can be repeated for whatever number of axles is used in a trailer combination.

Another important object of the invention is to provide a valve system wherein the emergency/parking valve cluster and the air tank filling and protection cluster and the service brake control are integrated into a single housing, and wherein both clusters have shuttles that measure the supply line air pressure with respect to atmospheric, and that then selectively and sequentially route the compressed air to the spring brake cluster and to the spring brake chamber and/or to the air reservoir tank depending on the state of pressurization thereof. The danger of defeating the mutual cooperating functions of these clusters if they were in separate housings by rupture of a line going between them is eliminated by placing them in a common housing so that no external interconnecting lines exist. Another advantage is the elimination of the risk of accidentally installing valves from different manufacturers which appear to be compatible, but in fact are not.

A further object of the invention is to provide a single-tank system in which the tank supplies air for the service brakes, but in which fluctuations of the emergency line or tank pressures during high-demand operation of the service brakes does not affect the pressure in the spring brakes, so long as the line pressure does not fall below said spring brake isolation pressure of 45 psi. This feature is important for the purpose of preventing partial release and dragging of the spring brakes during normal but heavy operation of the service brakes. Dragging of the spring brakes not only causes unnecessary wear, but creates a definite fire hazard. This feature of the invention prevents dragging without requiring a separate air tank for operation of the spring brakes. Another feature of the system is that the spring brakes are automatically applied in the case of venting or failure of the air pressure in the emergency/supply gladhand line, thereby providing both an emergency function and a parking function for a trailer separated from its tractor. The fact that spring brakes and not air service brakes are used for emergency and parking functions is important because it allows the driver to leave the vehicle parked on a hill without risk of run-away due to gradual loss of system pressure.

Still another important object of the invention is to provide a system which facilitates moving of a trailer from a highway after an accident or partial failure of its braking system. This is accomplished cooperatively by the spring valve cluster and the air reservoir filling cluster. Both of these clusters are connected to receive air from the emergency gladhand. In the case of a damaged system or a completely depressurized system, since the first 55 psi of air introduced into the trailer emergency gladhand is delivered solely to the spring brake cluster, air pressure sufficient to release the spring brakes to permit moving of the trailer can be built up in the spring brake chambers through the spring brake valve cluster despite a failure in the air tank system, or in the service brake system downstream of the tank filling valve cluster.

It is a further object of the invention to provide an air tank filling and protecting valve system in which the tank is filled from the emergency gladhand line only after the threshold pressure has been built up in the system, and the pressure in the emergency line is sufficient to release the spring brakes, and to provide a system in which no air pressure in the tank can be drawn down by back-flow through the valve cluster and gladhand line, whereby the tank pressure is protected and can be used only to operate the service brakes. The tank pressure, and the pressure contained in the spring brakes and protected by the spring brake valve cluster, are normally isolated from eachother.

Another very important object of this invention is to provide a service brake system which operates using pressure taken from the air tank and which includes a valve cluster that has increased sensitivity enabling its output pressure to follow more accurately changes in driver's pressure modulations, that has a lower initial valve cracking pressure which improves the brake balance of the tractor trailer rig, and that has a slight amplification of pressure applied to the brake diaphragms as compared with the pressure in the service gladhand whereby when a number of these valve clusters are connected in cascade the rearward axles will be braked more strongly than preceeding axles forward thereof.

Other objects and advantages of the invention will become apparent during the following discussion of the drawings.

BRIEF DESCRIPTION OF DRAWINGS

FIG. 3 is a cross-sectional view taken along line 3—3 of FIG. 1;

FIG. 5 is a partial cross-sectional view corresponding with a part of FIG. 3 but showing the tank filling valves in a different position;

FIG. 6 is a partial cross-sectional view corresponding with another part of FIG. 3 but showing the service brake operating valves in a different position.

DESCRIPTION OF PREFERRED EMBODIMENT OF INVENTION

Figure 1:
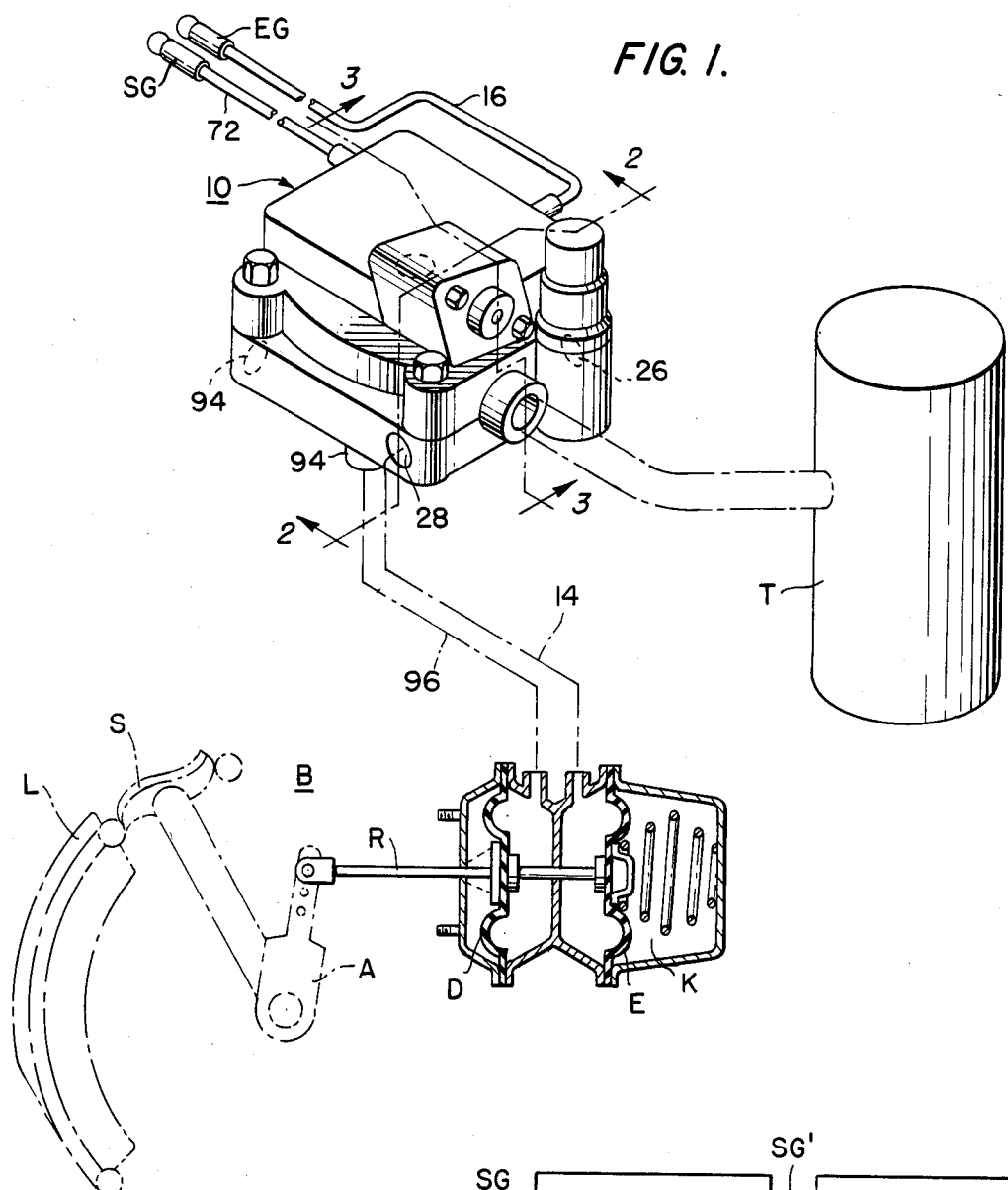
FIG. 1 is a schematic view of a brake system for a trailer including the present valve cluster housing and an air tank shown in perspective, and connected to trailer service and spring brakes shown in cross section.

Referring now to the drawings, FIG. 1 shows a schematic view of a typical brake assembly B for a trailer axle, including a brake lining L, operated by an S-cam S through a slack adjuster A. The brake is applied by a push rod R driven either by a spring brake K or by a service brake diaphragm D. The spring brake is normally held off by air pressure against the spring brake diaphragm E. The spring brake chamber which contains the diaphragm E and the service brake chamber which contains the service brake diaphragm D are both fed with compressed air to control their functions and this air comes from a compressor CM, FIG. 7A, in the tractor portion of the vehicle. The tractor cabin also includes as standard equipment a warning system WN which warns the driver whenever the compressed air pressure is below a selected level of 55 psi. This compressed air is supplied through a tractor protection valve TP and an emergency gladhand EG and is used to fill an air reservoir tank T to maintain it at an elevated pressure, typically 125 psi. The service brakes are responsive to a service brake control air signal entering the trailer through a service gladhand SG and the signal air line 72. A trailer brake system is conventionally supplied through a number of separate valves and air lines, and it is to improvements in such a conventional system that the present invention is addressed.

The features recited in the preceding paragraph are common to most trailer control systems, and in the present disclosure represent the parts of the system which serve one trailer axle only, the system being repeated in a modular manner for each other axle of each trailer.

The present disclosure provides an integrated valve housing 10 which contains three clusters of valves which serve in the system to: 1. control the spring brakes (FIGS. 2 and 4); 2. fill and protect the pressure in the air reservoir tank (FIGS. 3 and 5); and, 3. control the service brakes in response to pressure variations appearing in the service gladhand SG (FIGS. 3 and 6).

Figure 4:
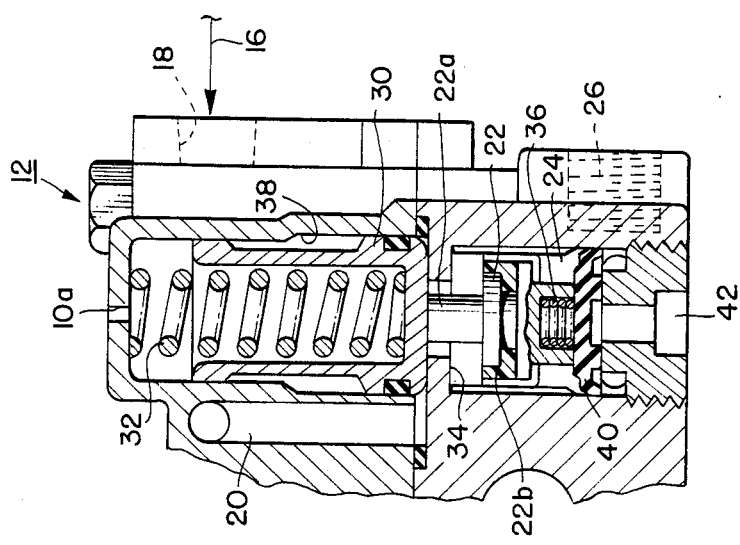
FIG. 4 is a partial cross-sectional view corresponding with a part of FIG. 2 but showing the spring brake operating valves in a different position.
Figure 2:
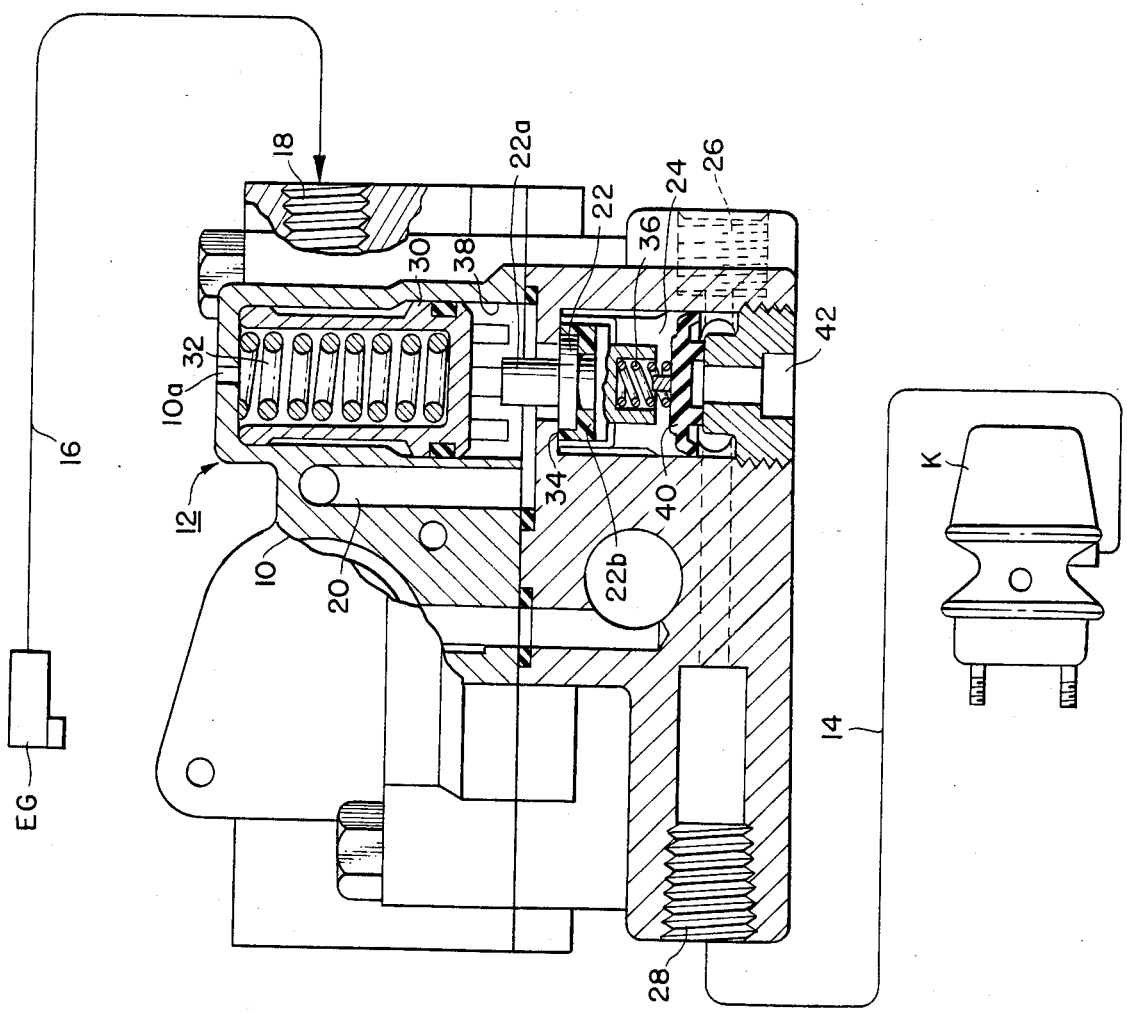
FIG. 2 is a cross-sectional view taken along line 2—2 of FIG. 1.

FIGS. 2 and 4 show cross sectional views of the spring brake valve cluster 12 taken along line 2—2 of FIG. 1, and illustrating the valve means which receives pressure from the emergency gladhand EG and which in turn is connected via air supply line 14 with spring brake chambers to actuate their spring brake diaphragms E, FIG. 1, normally holding the spring brakes OFF.

Assuming an initially depressurized system, when the compressor CM comes on, the air pressure from the compressor in the tractor will begin to build up, and the low pressure warning system WN will continuously warn the driver until the pressure exeeds the aformentioned threshold pressure of 55 psi. Before this level the tractor protection valve TP will have opened and pressure will be delivered to the emergency gladhand EG, and this pressure will be conducted through the gladhand air line 16, FIG. 2, into the housing 10 through the entrance port 18 and into the ducts 20 where it passes through a non-return check valve 22 into the bore 24 and into the outlet ports 26 and 28, which are respectively connected to the two spring brake actuator chambers via lines 14. As the air pressure builds up in the chambers, the brakes are released by air pressure on the diaphragms E, FIG. 1, in a well known manner. While the pressure in the gladhand EG is still low, i.e. below a pressure exceeding the minimum pressure required to open the tractor protection valve TP, but below the level at which the driver's low pressure warning WN is deactivated, for instance 45 psi, a shuttle 30 is pressed downwardly by a spring 32 to the position of the shuttle shown in FIG. 4, so that the bottom of the shuttle contacts the stem 22a and holds the valve 22 open, thereby lowering the seal 22b from the valve seat 34 in the bore 24, for the purpose hereinafter discussed. A weak spring 36 urges the valve 22 upwardly toward seated position. This shuttle 30 and spring 32 comprise means to measure the air pressure in the emergency gladhand line whereby as the pressure builds up in the system, the air pressure at the bottom of the shuttle 30 will overcome the spring 32 (at about 45 psi) and hold the shuttle 30 in the raised position shown in FIG. 2, the upper end of the bore 38 being vented as shown at 10a. This 45 psi is defined above as the spring brake isolation pressure, because so long as the pressure exceeds 45 psi the shuttle 30 will remain raised and the check valve 22 will remain closed against the seat 34 unless the pressure of the air entering the entrance port 18 exceeds the pressure in the bore 24 and therefore in the spring brake chambers. The cluster 12 includes a bleed valve 40 which normally closes the outlet ports 26 and 28 to an exhaust duct 42 leading to the atmosphere. FIG. 2 shows the shuttle raised, the check valve 22 closed, and the bleed valve 40 closed, which are the spring brake isolation positions occupied during normal operation of the tractor-trailer combination.

In operation, the valve cluster 12 shown in FIG. 2 allows air from the compressor to go directly to the spring brakes through the entrance port 18, the bore 38, the valve 22, the bore 24 and the outlet ports 26 and 28 at any time when the pressure in the emergency gladhand EG exceeds the pressure in the emergency brake air line 14. Thus during normal operation, if the pressure in the emergency gladhand EG is occasionally drawn down somewhat (but not below the isolation pressure of 45 psi) by heavy usage of the brakes, the check valve 22 will prevent loss of air in the spring brake line 14 by draining back through the valve cluster 12. In other words, the pressure in the spring brake line 14 will remain isolated from the gladhand EG and at the highest pressure that the compressor CM has delivered during operation of the system. However, if the pressure in the emergency gladhand EG should for some reason fall below the 45 psi isolation level for which the spring 32 is calibrated, then the shuttle 30 will descend and push the stem 22a downwardly, opening the check valve 22 as shown in FIG. 4. The isolation will cease, thereby allowing the pressure to fall in the spring brakes. The fall will be very quick to whatever level is in the emergency gladhand EG because the backward rush of air from the spring brake chambers through the outlet ports 26 and 28 will raise the bleed valve 40 and allow the air to exhaust directly to the atmosphere through the exhaust vent duct 42, as shown in FIG. 4, until the air pressure in the ports 26 and 28 again falls to a level equal to the pressure in the bore 24. Then the valve 40 will close again, and assuming that the gladhand EG pressure is below the isolation pressure of 45 psi, the check valve will remain open and the spring brake diaphragm pressure will match whatever pressure may remain in the gladhand EG. Thus, for gladhand pressures above the isolation pressure the spring brakes will be maintained at the highest pressure delivered by the compressor, but for gladhand pressures below the isolation pressure the spring brakes will be modulated by the pressure in the gladhand EG to which they are directly connected, since the shuttle 30 will hold the check valve 22 open continuously.

FIG. 3 shows the air reservoir tank T and shows an air supply valve cluster 50 which serves to fill and protect the pressure in the tank. Since this cluster is in the same housing as the cluster 12, the duct 20, FIG. 2, also connects air pressure from the emergency gladhand line 16 to the cluster 50. However, in FIG. 3 the line 16 from the gladhand EG is repeated to schematically show the introduction of air pressure into the duct 20a which is really a part of the duct 20 shown in FIG. 2. This pressure in duct 20a from the gladhand EG seeks to flow to the duct 52 which leads to the air tank T. However, the flow of air from the emergency gladhand EG to the tank T is controlled by a pressure responsive sliding valve 54 having a seal 54a at its left end. The right end of this sliding valve 54 comprises a shuttle member 56 that is urged leftwardly by a calibrated spring 58. The spring is in a bore 60 which is vented at 62, and the force of the spring is such that a level of air pressure which is above the threshold pressure of 55 psi, which is close to the pressure required to disable the low pressure warning means WN in the tractor cabin, is required in the duct 20a to displace the slide valve 54 and shuttle 56 rightwardly to compress the spring 58 and open the pressure responsive valve 54 by moving its seal 54a rightwardly. In other words, it requires a level exceeding said threshold level to be built up in the entrance port and duct 20a before air can be introduced through duct 52 into the air tank T. When air does flow toward the tank from the duct 20a and valve seal 54a as seen in FIG. 3, it flows through the bore 54b of the sliding valve 54 and through a tank protecting check valve 64 and then into the duct 52 leading to the tank T. This check valve protects the air pressure in the tank T from ever leaking back through the valve cluster 50 and into the gladhand line 16 if the pressure in the gladhand EG should drop.

The shuttle member 56 and calibrated spring 58 prevent filling of the tank from the emergency gladhand EG by remaining in the position shown in FIG. 5 until the threshold level of 55 psi has been reached in the gladhand, whereby the first 55 psi of pressure are routed only to release the spring brakes. This feature of the valve system permits the moving of a trailer regardless of the condition of the remainder of its brake system including the service brakes and the air tank T, provided the gladhand EG and the air line 16 and the spring brake system are operative, whereby the emergency removal of a parked trailer from an undesirable location is facilitated. Under normal conditions the check valve 64 protects the pressure in the tank T from draining back through the gladhand EG, whereby all air tank pressure remains available for use by the service brakes.

FIGS. 3 and 6 show a service brake relay valve cluster 70 which modulates the service brakes in response to pressure variations in the service gladhand SG as modulated by the driver of the vehicle using the pedal valve (not shown) located in the tractor. The service gladhand SG is connected to the valve housing 10 by an air line 72 entering at the inlet port 74. Pressure from the inlet port 74 appears in a large diameter bore 76 which contains a piston 78 whose position in the bore 76 is determined by the pressure above the piston in the bore 76 and by the pressure in the chamber 80 below the piston. The central area of the underside of the piston 78 overlies the upper seal 82a of a slide valve 82 which takes the form of a hollow spool and can seat thereagainst to close the central bore 82b of the slide valve 82, the lower end of which is vented to the atmosphere at the exhaust port 84. The slide valve extends into a bore 86 which is connected with the pressure duct 52. When the valve 82 is lowered against the upward force of a spring 88 as shown in FIG. 6, it opens by lowering the seal 90 away from the seat 92, thereby permitting air to flow from the tank T, duct 52 and bore 86 into the chamber 80, which connects directly to the service brake outlet ports 94 through air lines 96 to the service brake chambers for that axle to conduct air pressure to the diaphragms D, FIG. 1. A seal 98 seals the lower end of the bore 82b to the outer diameter of the slide valve 82. The piston 78 has an upward extension portion 78a rising into a bore 100 to which it is sealed by the seal 102. An additional port 94 shown in dotted lines in FIG. 1 is offered to allow piloting of a similar valve in cascade with this first valve, i.e. on another more rearwardly located axle or on a separate trailed vehicle.

In operation, the valve cluster 70 is initially positioned in a brake-vented position as shown in FIG. 3. However, when the pressure is applied through the service gladhand SG, the piston 78 moves down to a brake-applied position as shown in FIG. 6 to send to the service chambers air under pressure taken from the tank T according to the air pressure in the service gladhand SG under control of the operator's pedal valve (not shown). When the pressure in the gladhand SG line 72 is vented, the piston rises to the position shown in FIG. 3 and separates from the seal 82a at the upper end of the slide valve 82, whereby pressure in the service brakes is vented to atmosphere through the air hoses 96, the chamber 80, the bore 82b and the exhaust port 84, releasing the service brakes. Conversely, when the operator steps down on the pedal valve in the cab, introducing service signal air pressure into the service gladhand SG and the line 72 and bore 76, the piston 78 descends and first seals the opening between its lower central area and the upper seal 82a of the slide valve 82. As the pressure builds in the service gladhand SG and in the bore 76, the piston is lowered further, thereby unseating the valve 82 as shown in FIG. 6 by driving it down to lower the seal 90 away from the seat 92. This admits air from the tank T and duct 52 upwardly from the bore 86 and into the chamber 80 from which it flows directly to the outlet ports 94 and the air line 96 to actuate the service brake diaphragms D to apply the brakes and pilot a valve located downstream.

The service brake cluster just described operates similarly to other service brake relays in many respects. In terms of the general manner of their operation, the pressure in the chamber 80, which is directly connected to the service brake diaphragms D, is intended to accurately follow the pressure variations at the service gladhand. When the pressure in the bore 76 above the piston 78 increases, the piston descends to close against the seal 82a, closing the exhaust port and depressing the slide valve to unseat the seal 90 to admit a balancing air pressure to the chamber 80 and the port 94 as shown in FIG. 6. If the force generated by pressure above the piston falls below the force generated by the pressure in the chamber 80, the piston rises and separates from the seal 82a, opening the exhaust port 84, FIG. 3, and bleeding off some of the pressure in the chamber 80 until a balance of forces is restored above and below the piston 78.

The "sensitivity" of the valve refers to the accuracy with which the pressure in the chamber 80 follows pressure variations in the service gladhand SG. A large diameter piston tends to produce greater sensitivity. The diameter of the piston 78 should be at least three times the diameter of the slide valve 82, and in the present disclosure is shown to be four times its diameter.

Moreover, if the effective piston area above the piston seal 80a is exactly equal to the effective piston area below the piston seal 80a, neglecting friction, the valve tends to follow exactly the pressure variations in the service gladhand SG. The effective area on top of the piston is the area inside the O-ring 80a minus the area inside the O-ring 102; whereas the effective area of the bottom of the piston 78 is the area inside the O-ring 80a minus the area inside the seal 82a when the piston is seated against the end of the slide valve 82, FIG. 6. According to this invention, the effective area on top of the piston 78 is made slightly larger than the effective area on the bottom of the piston when closed against the slide valve 82 so that it takes a slightly higher pressure in the chamber 80 to balance the pressure in the bore 76 above the piston to achieve pressure amplification.

Figure 7A:
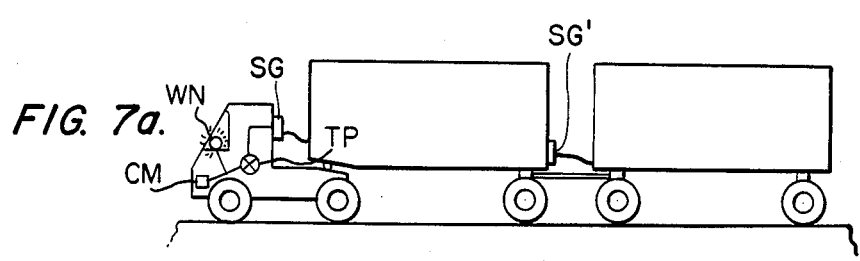
FIGS. 7A, 7B and 7C show a tractor-trailer rig and several ways of coupling the valve clusters of successive trailer axles.

Amplification of the braking pressure rearwardly of the vehicle combination can be used to achieve increased vehicle stability during hard braking. For instance, in a vehicle as shown in FIG. 7a, if successive axle brake systems are connected in cascade so that the amplified pressure in each axle brake system is used to actuate the service brake cluster in the next rearward axle valve housing, this results in a slight amplification of pressures in the brakes of axles as one proceeds rearwardly in trailer. Such amplification is known in the past, but has usually been accomplished by inserting an additional booster valve, rather than being accomplished by amplification as described above in the relay valve itself for the preceding axle. The ratio of bottom effective area to top effective area of piston 78 is advantageously selected at about 0.93. This means for example, that a pressure of 30 psi in the service gladhand, will produce an amplified pressure in the chamber 80 and at the outlet port 94 of 32.26 psi. If the valve cluster for the next rearward axle is operated from this 32.26 psi output, it will apply 34.69 psi to the brakes connected to it.

Figure 7B:
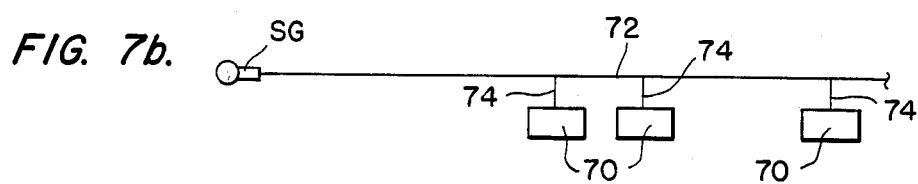
Figure 7C:
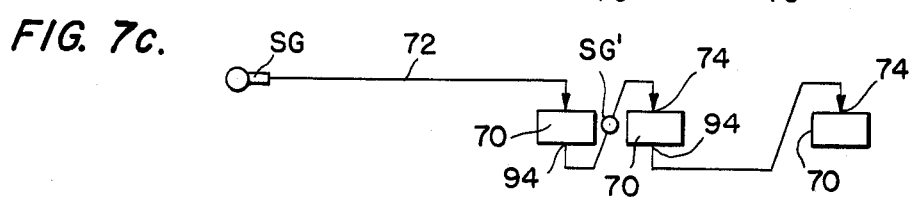

There are two ways in which succeeding axle valve clusters are connected. One way is to have the output pressure to the brakes at a port 94 in one cluster control the inlet port 74 of the valve cluster for the next axle rearwardly, FIG. 7c. If this is done, amplification is obtained from axle to axle, with however the disadvantage that a failure in one axle can disable operation of the brakes for succeeding axles. Alternatively, all valves may be connected in parallel, FIG. 7B, but at the expense of achieving no progressive brake pressure amplification.

Another novel feature of the present service brake valve cluster 70 is low cracking pressure, i.e. the pressure required to achieve initial opening of the service slide valve 82 from a fully closed position. In the present illustrative embodiment the tank air pressure in the duct 52, FIG. 3, acts on the slide valve 82 trying to move it axially upwardly to close it. The effective area of this air pressure force pressing the slide valve 82 upwardly, is the area below the seal 90 within the bore 86 minus the area inside of the seal 98. Enough force has to be exerted by the piston 78 against the upper end of the slide valve 82 to displace it downwardly against the air pressure in the duct 52 multiplied by this effective area, plus the upward force of the spring 88 which is small, and plus friction. A small cracking pressure, means that the amount of pressure in the service gladhand SG to overcome it can be small. Note that if the cracking pressure is high, the initial application of the brakes will require a large initial pressure in gladhand SG which tends to cause the brakes to apply rather suddenly, whereby the driver will experience difficulty in achieving gentle braking and will tend to over-brake. Note also that in vehicle combinations having several trailers and/or multiple axles, FIG. 7a, the sensitivity biases in booster relay valve systems add together so that the loss of control signal pressure becomes cumulative toward the rear of the vehicle. The amplification feature discussed above tends to compensate for this problem and eliminate unbalance in the application of rear axle brakes as compared with the application of brakes further forward in the vehicle. The present design achieves a cracking pressure of only about 2 psi, and the brake pressure will follow almost the same functional curve during application as during release, with minimum hysteresis.

Thus excellent service brake sensitivity, amplification from axle to axle, and low cracking pressure are all achieved in a single service brake valve assembly without the addition of extra parts or extra booster valves at each axle.

The present invention is not to be limited to the exact embodiments shown in the drawings, for obviously changes may be made within the scope of the following claims.

I claim:

1. In a tractor and trailer rig of the type wherein the tractor includes a source of air under pressure and a tractor protection valve that will supply air to the trailer whenever the air pressure is above a minimum supply line pressure and wherein the tractor includes low-pressure warning means operative to warn the driver whenever the air pressure in the tractor is below a predetermined threshold level, and wherein each trailer includes at each axle brake means including compressed air tank means and including spring brake means having actuator means which are compressed-air operated to hold the spring brake means OFF and including service brake means having actuator means which are compressed-air operated to apply the service brake means, and wherein each trailer is coupled to receive compressed air through an emergency gladhand and to receive a service brake air pressure control signal through a service gladhand, a brake valve system for each axle of each trailer, comprising:
   (a) valve housing means;
   (b) a spring brake valve cluster comprising a non-return check valve connected to receive and pass air pressure from the emergency gladhand and to deliver it directly to the spring brake actuator means, and the spring brake valve cluster further including means operative to measure the air pressure in the emergency gladhand and to open the check valve whenever the measured pressure is below a predetermined spring brake isolation pressure which exceeds said minimum supply line pressure but is low enough to actuate said driver warning means, whereby to protect the spring brake actuator means and maintain its pressure at the maximum operating emergency gladhand pressure until the latter falls below said isolation pressure;
   (c) an air tank supply valve cluster connected between said emergency/supply gladhand and said tank means and operative to fill said tank means, the supply valve cluster comprising a pressure responsive valve operative to sense pressure in the emergency gladhand and to open at pressures above said threshold pressure whereby to pass air to the tank means, and the supply valve cluster further including a tank protecting check valve interposed between the pressure responsive valve and the tank means and continuously operative to prevent backflow of air from the tank means toward the emergency gladhand; and
   (d) a service brake relay valve cluster connected between the tank means and the service brake actuator means to supply and modulate air to the latter from the tank means in response to variations in the level of the service brake air pressure signal.

2. The brake system as claimed in claim 1, wherein said spring brake valve means further includes bleed valve means in the housing means and coupled with a housing vent and communicating with said spring brake actuator means for quickly bleeding pressure from the spring brake actuator means to the atmosphere when the pressure at the spring brake actuator means exceeds the pressure at the check valve as a result of the check valve being opened in response to a fall of pressure in the emergency gladhand below said predetermined isolation pressure.

3. The brake system as claimed in claim 1, wherein said means operative to measure the pressure at the emergency gladhand and to open the check valve comprises a shuttle slidable in a bore in the housing means and having a first end disposed opposite said check valve, the shuttle being exposed to the pressure in the emergency gladhand at its first end opposite said check valve and being vented to atmospheric pressure at its other end; and a calibrated spring in the bore and abutting said other end of the shuttle to press it in a direction to hold open the check valve, the air pressure of the emergency gladhand at said first end of the shuttle displacing the shuttle away from the check valve when the force of the gladhand pressure on the shuttle exceeds the force of the calibrated spring.

4. The brake system as claimed in claim 1, wherein said pressure responsive valve in the tank supply valve cluster comprises a shuttle in a bore in the housing means communicating with the emergency gladhand and with the tank means, the shuttle having a seal at one end disposed when seated to prevent air from the emergency gladhand from entering the tank means, the bore being vented at the other end and having a calibrated spring urging the shuttle along the bore to seat the seal, the force of the air pressure in the emergency gladhand displacing the shuttle along the bore from seated position against the spring force to admit air to the tank means when the gladhand pressure exceeds said threshold pressure.

5. The brake system as claimed in claim 1, wherein the service brake valve cluster comprises a piston slidable in a bore in the housing means and axially moveable between a service brake-vented position and progressively-increasing brake-applied positions, the bore on a first side of the piston being connected to receive a service brake control signal whereby the piston is displaced toward a brake-applied position in response thereto, and the service brake cluster further including a normally closed slide valve in a bore in the housing means communicating with the tank means and actuatable to control the flow of air from the tank means to a chamber in the housing means communicating with the second side of the piston and with the service brake actuator means, the slide valve being contacted and actuated by the second side of the piston when in a brake-applied position to introduce into the chamber and against the second side of the piston pressure from the tank means opposing the service signal pressure on the piston, the piston having an extension portion on its first side isolated from the service brake control signal pressure and operative to reduce the effective area of the first side of the piston on which the service brake air signal acts sufficiently so that said effective area closely approaches the effective area on the second side of the piston on which the opposing air pressure acts when the second side of the piston is in contact with the slide valve, whereby the air pressure on the second side of the piston is at least equal to the air pressure on the first side of the piston when the forces of these pressures are in balance.

6. The brake system as claimed in claim 5, wherein said slide valve comprises a hollow spool whose center is vented to the atmosphere, the slide valve having a seal around its outer surface cooperating with a seat in its bore for controlling the flow of air from the tank and having a seal at its end for contacting the second side of the piston and sealing its hollow center when the piston is in contact with the slide valve, and said extension portion on the first side of the piston being contained in a portion of the bore isolated from the service brake air pressure signal and the piston having a vent from said portion of the bore communicating into the vented center of the slide valve, whereby the chamber at the second side of the piston is vented to atmosphere through the center of the slide valve when the piston is out of contact with the slide valve and whereby only said portion of the bore and the center of the slide valve are vented when the piston is in contact with the slide valve.

7. The brake system as claimed in claim 6, wherein the effective area responsive to the service brake air pressure signal on the first side of the piston is slightly greater than the effective area responsive to the opposing air pressure on the second side of the piston when it is in contact with the seal at the end of the slide valve, whereby amplification of the air pressure in the chamber on said second side of the piston occurs with respect to the service brake air pressure signal on the first side of the piston.

8. The brake system as claimed in claim 6, wherein the diameter of the piston is at least three times greater than the diameter of the slide valve, whereby to achieve increased sensitivity in the ability of the piston to accurately follow variations in the service brake signal air pressure.

9. The brake system as claimed in claim 5, wherein the effective area responsive to the service brake air pressure signal on the first side of the piston is slightly greater than the effective area responsive to the opposing air pressure on the second side of the piston when in contact with the slide valve, whereby amplification of the air pressure in the chamber on said second side of the piston occurs with respect to the service brake air pressure signal on the first side of the piston.

10. The brake system as claimed in claim 9, wherein the valve systems for trailer axles located further back in the rig are connected in cascade with a valve system located forward thereof in the rig, the further-back axle valve systems having their service brake control air signals coupled directly into the chamber on the second side of the piston in said forward valve system, whereby the further-back service brakes are applied more strongly than the service brakes associated with said forward valve system by a factor proportional to the amplification achieved in said forward valve system.

11. The brake system as claimed in claim 6, wherein the outer diameter of the seal around the outer surface of the slide valve spool is only slightly larger than the outer diameter of the outer surface of the spool, whereby to achieve low cracking pressure required to initially displace the slide valve when the piston contacts it.

12. The brake valve system as claimed in claim 1, wherein said housing means comprises a single metal housing enclosing said spring brake cluster and said tank supply cluster and said service brake cluster, the valve housing having spring brake ports connected with the spring brake actuator means and communicating with the spring brake cluster, and having service brake ports connected with the service brake actuator means and communicating with said chamber of the service brake cluster, and having a pressure entrance port connected with the emergency gladhand and communicating directly with both the spring brake cluster and the tank supply cluster, and having an inlet connected to receive the service brake air pressure signal.

13. In a truck brake system having brake means including spring brake means having actuator means which is compressed-air operated to hold the spring brake means OFF and including service brake means operative above a minimum service brake pressure to apply the service brake means and the system including a supply line through which it receives compressed air and including a source of a service brake air pressure control signal, spring brake valve means comprising:
(a) valve housing means;
(b) a normally operative non-return check valve in the housing means and connected to receive air pressure from the air supply line and to open and deliver it directly to the spring brake actuator means to maintain the pressure in the actuator means at the highest level attained by the pressure in the supply line, and being operative to close when the air pressure in the supply line is less than the pressure in the actuator means to prevent back flow of air pressure into the supply line; and
(c) shuttle means in the housing means operative to measure the air pressure in the supply line and operative whenever the measured pressure is above a predetermined spring brake isolation pressure which exceeds said minimum service brake pressure but is just sufficient to hold OFF said spring brake means to move away from contact with the check valve, and the shuttle means being operative when the air pressure is below said predetermined spring brake isolation pressure to move into contact with the check valve and hold it open, whereby to couple the spring brake actuator means directly to the supply line to have its pressure modulated by fluctuations in the supply line.

14. The truck brake system as claimed in claim 13, wherein said spring brake valve means further includes bleed valve means in the housing means and coupled with a housing vent and communicating with said spring brake actuator means for quickly bleeding pressure from the spring brake actuator means to the atmosphere when the pressure at the spring brake actuator means exceeds the pressure at the check valve as a result of the check valve being opened in response to a fall of pressure in the supply line below said predetermined isolation pressure.

15. The brake means as claimed in claim 13, wherein said shuttle means operative to measure the pressure at the supply line and to open the check valve comprises a shuttle slidable in a bore in the housing means and having a first end disposed opposite said check valve, the shuttle being exposed to the pressure in the supply line at its first end opposite said check valve and being vented to atmospheric pressure at its other end; and a calibrated spring in the bore and abutting said other end of the shuttle to press it in a direction to hold open the check valve, the air pressure of the supply line at said first end of the shuttle displacing the shuttle away from the check valve when the force of the supply line pressure on the shuttle exceeds the force of the calibrated spring.

16. In a truck brake system having brake means including air tank means and including spring brake means having actuator means which is compressed-air operable to release the spring brake means at pressures above a predetermined threshold pressure which is just sufficient to hold the spring brake means OFF and including service brake means which is compressed-air operated to apply air from the tank means to service brake actuator means and the system including a supply line through which it receives compressed air and including a source of a service brake air pressure control signal, air tank supply valve means comprising:
(a) valve housing means;
(b) an air tank supply valve cluster in the housing means and connected between said supply line and said tank means, the supply valve cluster comprising a pressure responsive valve operative to sense pressure in the supply line and to open to supply air to the tank means at tank-filling pressures which exceed said predetermined threshold level, said pressure responsive valve comprising a shuttle in a bore in the housing means and having a bore through the shuttle communicating with the supply line and with the tank means, the shuttle having a seal at one end disposed when seated to close the shuttle bore and prevent air from the supply line from entering it, the housing bore being vented at the other end and having a calibrated spring urging the shuttle along the housing bore to seat the seal and close the shuttle bore, the force of the air pressure in the supply line when exceeding said predetermined threshold level displacing the shuttle along the housing bore from seated position against the spring force to admit air to fill the tank means;
(c) and the supply valve cluster further including a tank protecting check valve disposed in the shuttle bore and continuously operative to prevent backflow of air through the shuttle bore from the tank means toward the supply line.

17. In a truck brake system having brake means including air tank means and including service brake means which is compressed-air operated to apply air from the tank means to service brake actuator means and the system including a supply line through which it receives compressed air and including a source of a service brake air pressure control signal, service brake valve means comprising:
(a) valve housing means;
(b) a service brake valve cluster in said housing means and including a piston slidable in a bore in the housing means and axially moveable between a service brake-vented position and progressively-increasing brake-applied positions, the bore on a first side of the piston being connected to receive a service brake control signal whereby the piston is displaced toward a brake-applied position in response thereto;
(c) the service brake cluster further including a normally closed slide valve in a bore in the housing means communicating with the tank means and actuatable to control the flow of air from the tank means to a chamber in the housing means communicating with the second side of the piston and with the service brake actuator means, the slide valve being contacted and actuated by the second side of the piston when in a brake-applied position to introduce into the chamber and against the second side of the piston pressure from the tank means opposing the service signal pressure on the piston;
(d) and the piston having an extension portion on its first side isolated from the service brake control signal pressure and operative to reduce the effective area of the first side of the piston on which the service brake air signal acts sufficiently so that said effective area closely approaches the effective area on the second side of the piston on which the opposing air pressure acts when the second side of the piston is in contact with the slide valve, whereby the air pressure on the second side of the piston is at least equal to the air pressure on the first side of the piston when the forces of these pressures are in balance.

18. The brake system as claimed in claim 17, wherein said slide valve comprises a hollow spool whose center is vented to the atmosphere, the slide valve having a seal around its outer surface cooperating with a seat in its bore for controlling the flow of air from the tank and having a seal at its end for contacting the second side of the piston and sealing its hollow center when the piston is in contact with the slide valve, and said extension portion on the first side of the piston being contained in a portion of the bore isolated from the service brake air pressure signal and the piston having a vent from said portion of the bore communicating into the vented center of the slide valve, whereby the chamber at the second side of the piston is vented to atmosphere through the center of the slide valve when the piston is out of contact with the slide valve and whereby only said portion of the bore and the center of the slide valve are vented when the piston is in contact with the slide valve.

19. The brake system as claimed in claim 17, wherein the effective area responsive to the service brake air pressure signal on the first side of the piston is slightly greater than the effective area responsive to the opposing air pressure on the second side of the piston when it is in contact with the seal at the end of the slide valve, whereby amplification of the air pressure in the chamber on said second side of the piston occurs with respect to the service brake air pressure signal on the first side of the piston.

20. The brake system as claimed in claim 18, wherein the outer diameter of the seal around the outer surface of the slide valve spool is only slightly larger than the outer diameter of the outer surface of the spool, whereby to achieve low cracking pressure required to initially displace the slide valve when the piston contacts it.

* * * * *